United States Patent [19]

Taylor et al.

[11] Patent Number: 5,730,446
[45] Date of Patent: Mar. 24, 1998

[54] SEALING STRIP SUITABLE FOR SEALING A HEM FLANGE

[75] Inventors: Roger Taylor, Dronfield, England; Pierre Mader, La Garenne Colombes; Alain Lamon, Osny, both of France

[73] Assignee: Minnesota Mining and Manufacturing Company, St. Paul, Minn.

[21] Appl. No.: 492,596

[22] Filed: Jun. 20, 1995

[51] Int. Cl.⁶ .................................................. F16J 15/00
[52] U.S. Cl. ........................... 277/312; 277/516; 277/637; 277/644; 277/650; 49/462; 52/459
[58] Field of Search ........................... 277/227, 228, 277/229; 296/191, 146.5; 52/204.53, 784.12, 784.13, 459, 465; 49/462

[56] References Cited

U.S. PATENT DOCUMENTS

| | | | |
|---|---|---|---|
| 1,417,487 | 5/1922 | Baumgartl | 52/465 |
| 1,605,573 | 11/1926 | Stedman | 52/459 |
| 3,401,486 | 9/1968 | Adell | 49/462 |
| 4,575,147 | 3/1986 | Ui et al. | 296/154 |
| 4,629,648 | 12/1986 | Minick et al. | 428/189 |
| 4,654,250 | 3/1987 | Black et al. | 428/195 |
| 4,888,919 | 12/1989 | Strosberg et al. | 49/502 |

FOREIGN PATENT DOCUMENTS

| | | | |
|---|---|---|---|
| 2 164 206 | 7/1973 | France . | |
| 2 275 707 | 1/1976 | France . | |
| 2 429 944 | 1/1980 | France . | |
| 3238651 | 4/1989 | Germany | 296/191 |
| 0025317 | 2/1977 | Japan | 296/191 |
| 4095590 | 3/1992 | Japan | 296/191 |

*Primary Examiner*—Daniel G. DePumpo
*Attorney, Agent, or Firm*—William L. Huebsch

[57] ABSTRACT

A sealing strip (5) for a hem flange between two panels (for example, the inner and outer panels (1, 3) of a vehicle door) comprises an inner portion (9) of a tacky, sealing material with an outer part (10) of a non-tacky material, providing the strip with a rounded, shape-retaining, outer surface. To seal the hem flange, the strip (5) is pressed into place along the edge of the flange so that the inner surface (7) of the strip adheres to the panels and the rounded outer surface (10) extends from one panel to the other and covers the tacky material.

10 Claims, 3 Drawing Sheets

SEALING STRIP SUITABLE FOR SEALING A HEM FLANGE

The present invention relates to a sealing strip suitable for use in sealing a joint between two surfaces lying adjacent one another in generally parallel planes, for example surfaces (such as panels) that are butted together or overlap one another. The invention is particularly, but not exclusively, applicable to a sealing strip suitable for use in sealing a hem flange, such as may be found on a vehicle body. The invention also relates to a method of sealing a joint between two adjacent surfaces.

A hem flange between two panels is formed by turning an extended edge portion of one panel back over an edge portion of the other panel. Hem flanges can be found in various locations in vehicle bodies where two panels are joined together, for example on doors, boot lids and bonnets. A vehicle door, for example, may be formed from an inner panel and an outer panel joined together along their outer edges by a hem flange which is formed by turning the extended edge portion of the outer panel back over the edge portion of the inner panel to form an overlap joint, and crimping the edges together. A seal is then needed between the edge of the outer panel and the adjacent surface of the inner panel, to keep moisture out of the space between the panels and prevent corrosion.

If a vehicle door is damaged, it can sometimes be repaired by replacing only the outer panel but, if that is done, it is clearly desirable (from the point of view of the vehicle owner) that the repaired door should match the original as closely as possible not only in quality but also in appearance. In practice, one of the most difficult parts of the repair job is to seal the hem flange effectively and in such a way that it closely resembles the seal on the original door, which would generally have been formed by an automated process.

At present, one of the best ways for a vehicle repairer to seal a hem flange is by using a liquid sealer which is extruded (for example, from a sachet or a cartridge using an extrusion gun) on to the hem flange. The repairer requires skill, when using the sealer, to produce a seal which is of a regular shape and matches the original. Moreover, the liquid sealer requires a long drying/curing time before it can be handled, which not only delays completion of the repair work but also leaves the seal open to damage during the drying/curing period. An additional problem, when liquid sealer is applied from a cartridge using an air-powered applicator, is that the finished seal may contain air bubbles.

Various forms of weather strip and various forms of edge guard are known for use on vehicle doors, some of which are intended to be associated with the hem flange. As an example, U.S. Pat. No. 4,575,147 describes an elastic molding which is secured to the hem flange on the upper edge of a vehicle door to protect the flange and also to intercept water flowing down off the vehicle roof. The elastic molding does not seal the hem flange. As another example, U.S. 4,888,919 describes a seal member which is located adjacent the hem flange on a vehicle door so that it will engage the vehicle body when the door is closed. In that case, the seal member requires an upstanding flange to be provided on the turned-back edge portion of the outer door panel. Preformed sealing strips for use in other locations are also known. For example, U.S. Pat. No. 4,629,648 and U.S. Pat. No. 4,654,250 both describe a caulking strip for use as a sealant between a bath and an adjacent wall, the strip comprising a body, having a trapezoidal cross-section, which is made of a tacky rubber-based material with a protective strip of a non-tacky polymeric film material on one side.

The present invention is concerned with the problem of enabling a joint between adjacent, generally parallel, surfaces (especially a hem flange between two panels) to be sealed comparatively quickly and easily, and in a predictable and reproducible manner, thereby in particular enabling the cost of vehicle repairs to be reduced.

The present invention provides a sealing strip for sealing a joint between two adjacent, generally parallel surfaces, the sealing strip having an inner surface for securing the strip over the joint, and a rounded, shape-retaining, outer surface; the profile of the strip being such that, when the strip is secured in position over the joint, the outer surface of the strip extends from one of the said adjacent surfaces to the other. "Shape-retaining" means that the outer surface substantially maintains its rounded shape when subjected to manual pressure, or rapidly reverts substantially to its rounded shape when that manual pressure is released. In the particular case in which the sealing strip is for use in sealing one side of an overlap joint between edge portions of two panels, the profile of the strip is such that, when the strip is secured in position over the joint, the outer surface of the strip extends between the exposed surfaces of the panels.

More specifically, the present invention provides a sealing strip for sealing a joint between two adjacent, generally parallel surfaces, the strip having an inner portion comprising a sealing material for securing over the joint, and a rounded outer surface comprising a non-tacky material which extends from one side of the inner surface of the strip to the other.

The present invention also provides a method of sealing a joint between two adjacent, generally parallel surfaces, the method comprising securing a preformed sealing strip along the joint by means of an adhesive/sealing material, the preformed strip having a rounded, shape-retaining, outer surface and being secured along the joint so that the outer surface of the strip extends from one of the said adjacent surfaces to the other and covers the adhesive/sealing material. In the particular case of an overlap joint between edge portions of two panels, the strip is secured along one side of the joint so that the outer surface of the strip extends between the exposed surfaces of the panels and covers the adhesive/sealing material.

A joint between two adjacent, generally parallel surfaces, in accordance with the invention, includes a seal which comprises a preformed strip secured over the joint by an adhesive/sealing material, wherein the outer surface of the strip is rounded and extends from one of the said adjacent surfaces to the other, covering the adhesive/sealing material. In the particular case of an overlap joint between edge portions of two panels, the strip is secured along one side of the joint and the outer surface of the strip extends between the exposed surfaces of the panels, covering the adhesive/sealing material.

By way of example only, embodiments of the invention will be described with reference to the accompanying drawings, in which:

FIG. 1 shows a cross-section of a hem flange which, for the purposes of the present description, is assumed to be at the edge of a vehicle door. The present invention is, however, applicable to any hem flange (whether located in a vehicle body or elsewhere) and, indeed, to any joint between two adjacent, generally parallel, surfaces.

Figure 1:
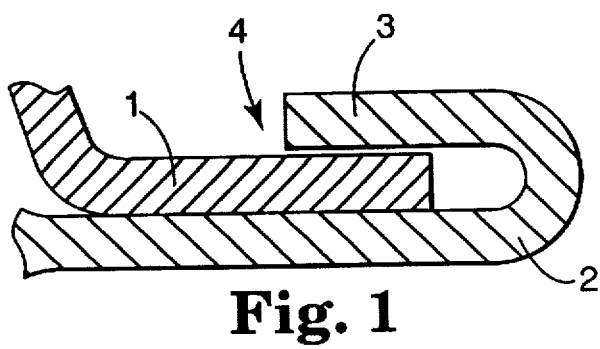
FIG. 1 is a diagrammatic cross-section of a hem flange at the edge of a vehicle door.

The hem flange shown in FIG. 1 joins together the inner panel 1 and the outer panel 2 of a vehicle door and is formed by turning the extended edge portion 3 of the outer panel 2 back over the edge portion of the inner panel 1 and crimping the edges together. A seal (not shown) is then formed on the inside of the door, in the region 4 between the edge of the outer panel 2 and the adjacent surface of the inner panel 1, to impede the entry of moisture into the space between the panels. If the outer panel 2 is a replacement panel (i.e. because the vehicle door is being repaired), it is necessary for the repairer to replace the seal in the region 4 as well.

Figure 2:
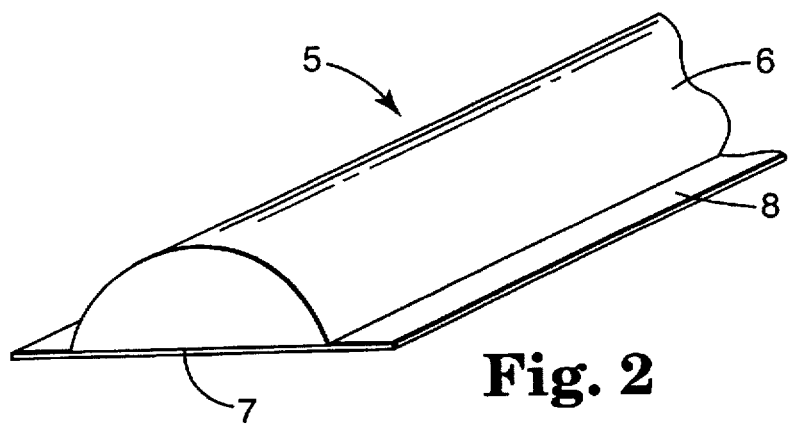
FIG. 2 is a perspective view of a preformed sealing strip for the hem flange shown in FIG. 1.

FIG. 2 is a general view of a preformed sealing strip 5 for use in the region 4 of the hem flange shown in FIG. 1. In cross-section, the strip 5 has a curved outer surface 6 and a flat inner surface 7 although various other cross-sectional shapes are possible as will be described below. The strip 5 is supplied on a release liner 8 (which contacts the flat surface 7) and it may be supplied in individual lengths, or it may be a continuous length supplied, for example, from a roll. The manner in which the strip 5 is used is illustrated in FIGS. 10a, 10b and 10c and will be described below.

Figure 3:
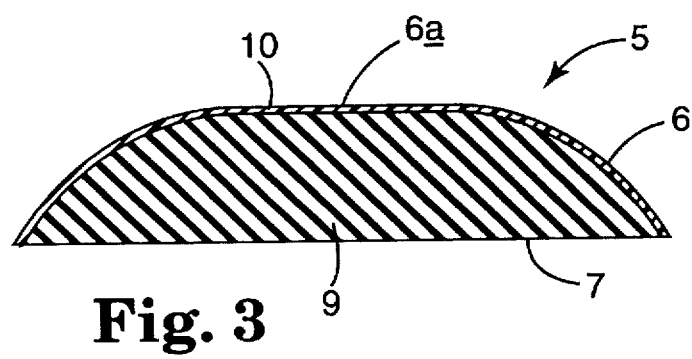
FIGS. 3 to 9 show alternative cross-sections, not all to the same scale, for the sealing strip shown in FIG. 2.

The strip 5 (with the release liner 8 omitted) is shown in greater detail in FIG. 3, with a slightly different cross-section. It can be seen that, in this case, the outer surface 6 of the strip is not completely curved but has a flattened central section 6a, although that is not essential. The strip comprises a tacky sealing material 9 (for example a butyl rubber), providing a flat inner surface 7 which will adhere to the door panels 1, 2, and a comparatively-thin outer layer 10 of a non-tacky, harder material (for example polyurethane) providing the outer surface 6. The layer 10 extends completely across the outer surface 6 of the strip 5, that is from the junction with the flat surface 7 on one side to the junction with the flat surface on the other side, and in some cases may even extend further than the flat surface 7 so that it projects slightly on both sides of the strip. The strip 5 has a width of about 10 mm and a maximum height of about 2 mm; the width of the flattened section 6a of the outer surface is about 4 mm, and the layer 10 has a thickness in the range of from about 0.1 to 1.0 mm. The strip may be formed by co-extruding the sealing material 9 and the outer layer 10 on to the release liner 8 (FIG. 2), with the extrudate then being forcibly cooled or allowed to cool naturally.

Figure 10A:
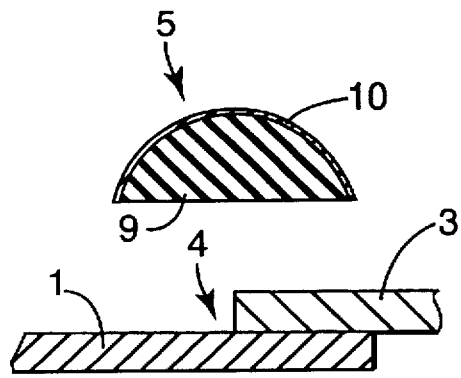
FIGS. 10a, 10b and 10c illustrate the method of applying a sealing strip to a hem flange.
Figure 10B:
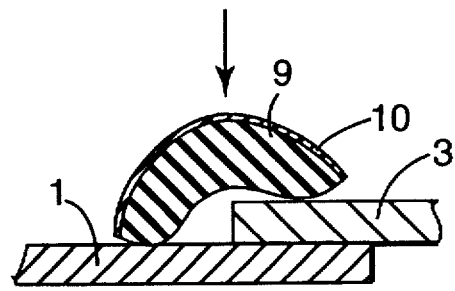
Figure 10C:
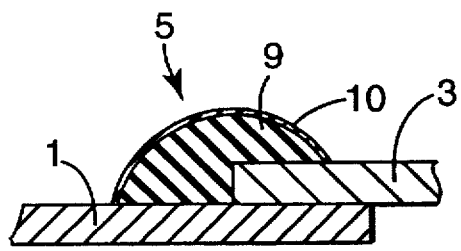

To use the strip 5, it is simply peeled from the release liner 8, positioned at the region 4 of the hem flange along the edge 3 of the outer panel 2 as illustrated in FIG. 10a and then pressed into place as indicated in FIG. 10b so that the material 9 seals against both the inner and the outer panels 1, 2 while the outer layer 10 extends from the surface of the inner panel 1 of the door to the surface of the outer panel 2, as shown in FIG. 10c, and covers the sealing material. The outer layer 10 on the strip, being comparatively hard, is not deformed when the strip is pressed into place but retains its uniform appearance along the length of the hem flange. The seal 5 is then immediately ready for the next stage of the repair process (for example, painting).

Figure 6:
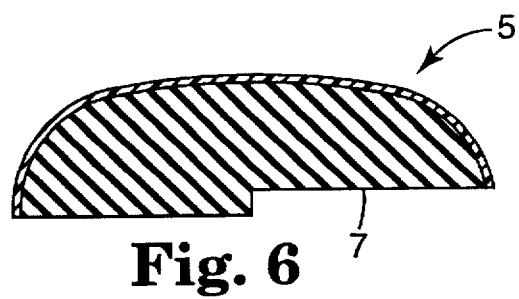
Figure 7:
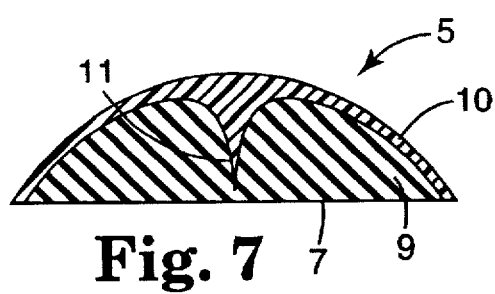
Figure 8:
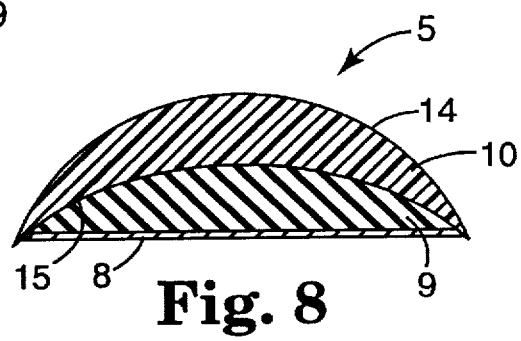

Alternative shapes for the cross-section of the strip 5 are shown in FIGS. 4 to 9, with the release liner 8 being omitted from FIGS. 4 to 7 and 9, but included in FIG. 8. In each case, the dimensions of the strip are similar to those given above for the strip shown in FIG. 3. Corresponding parts of the strips carry the same reference numerals.

Figure 4:
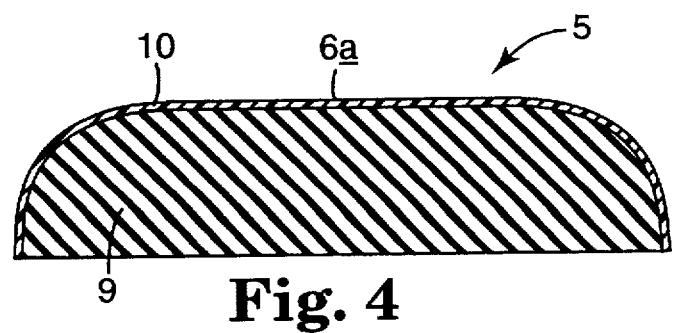
Figure 5:
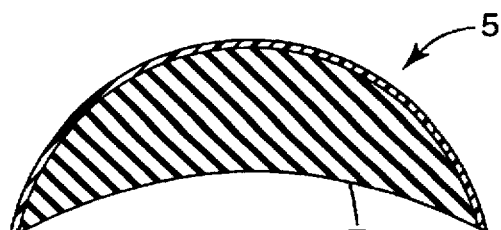

The shape shown in FIG. 4 is generally similar to that shown in FIG. 3 but the flattened central section 6a of the outer layer 10 is extended, for example to a width of about 6 mm. The cross-section shown in FIG. 5 is similar to that shown in FIG. 2 except that the inner surface 7 is concave rather than flat, while the cross-section shown in FIG. 6 is similar to that shown in FIG. 4 except that the inner surface 7 is stepped to match the profile of the hem flange.

FIG. 7 shows the cross-section of a strip which is similar to that shown in FIG. 2 but in which the outer layer 10 extends into the sealing material 9 in the central region of the strip to form a strengthening rib 11. As shown in FIG. 7, the rib 11 does not extend to the inner surface 7 of the strip (typically, the height of the rib is about 1.5 mm) and so will not prevent the strip being pressed into place on the hem flange: however, the rib does give a harder feel to the strip and reduces the risk that the sealing material 9 will extend beyond the edges of the outer layer 10 when the strip is being pressed into place.

In the strip shown in FIG. 8, the outer layer 10 takes the form of an outer strip of polyurethane or a similar, comparatively-hard, non-tacky, material, having a curved outer surface 14 and a concave inner surface 15, the latter containing the sealing material 9 which is covered by the release liner 8. As shown in FIG. 8, the outer strip 10 extends beyond, and so completely covers, the sealing material 9. Although the sealing strip shown in FIG. 8 could be formed by co-extrusion of the outer layer 10 and the sealing material 9, it could also be assembled by applying the sealing material 9 in a separate operation to a preformed outer strip 10 using, for example, an extrusion device. That assembly operation could be carried out by the manufacturer or by the end user.

Figure 9:
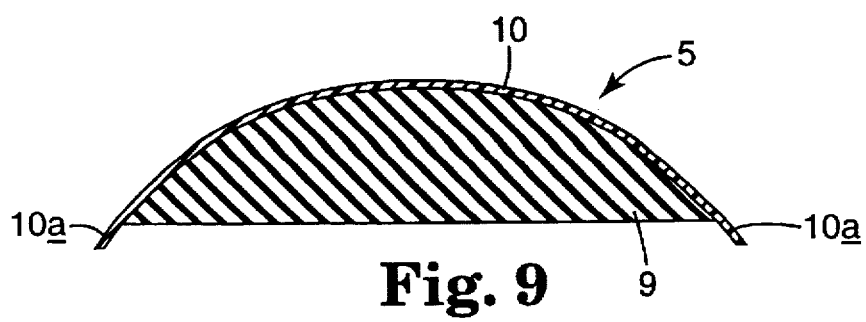

FIG. 9 shows a sealing strip which is generally similar in cross-section to that shown in FIG. 2 except that, in this case also, the outer layer 10 extends beyond the sealing material 9. In the strip shown in FIG. 9, however, the inner surface of the layer 10 is tacky to ensure that the extended edges 10a of the layer 10 adhere to the surfaces to which they are applied. It will be appreciated that the outer layer 10 of any of the strips shown in FIGS. 3 to 7 could have similarly-extended edges 10a.

The preformed strips 5 shown in FIGS. 4 to 9 are all applied to a hem flange in the same way as the strip shown in FIG. 2, that is: the release liner 8 (not shown in FIGS. 4 to 7 and 9) is removed, the strip 5 is positioned at the region 4 of the hem flange along the edge 3 of the outer panel 2 of the vehicle door as illustrated in FIG. 10a, and is then pressed into place as indicated in FIG. 10b. When the strip is in position, the material 9 seals against both the inner and outer panels 1, 2 of the vehicle door and is covered by the outer layer 10 of the strip, which still has its original rounded shape (at least substantially) and extends from the inner panel 1 to the outer panel 2, as shown in FIG. 10c. The seal can then be handled immediately.

Preferably, when any of the above-described strips 5 is applied to a hem flange, the outer layer 10 of the strip 5 actually touches the surface of the inner panel 1 at one side and the surface of the outer panel 2 at the other side so that it extends continuously from one surface to the other. In practice, however, there can be a small gap between one or both sides of the outer layer 10 and the surface of the adjacent panel 1, 2 without detriment to the sealing function of the strip. Such a gap may be covered by any coating, for example paint, that is subsequently applied over the strip.

As an alternative, in the case of the sealing strip shown in FIG. 8, the sealing material 9 and the outer strip 10 could be supplied, and applied to a hem flange, as separate components (the sealing material being supplied in strip form on a release liner). A hem flange would then be sealed by applying the sealing material to the region 4 of the hem flange along the edge 3 of the outer panel 2, removing the liner, and then applying the outer strip 10 to the sealing material. The finished seal would be the same as that achieved using the preformed strip 5 shown in FIG. 8.

Although the sealing material 9 of the strip 5 is tacky and does not normally require an adhesive to secure it to the panels 1, 2, it is possible to use an adhesive if preferred. The adhesive could be coated onto the inner surface 7 of the strip as the latter is being formed on the release liner 8 (FIG. 2) or it could be coated onto the region 4 of the hem flange before the strip is applied to the flange. Alternatively, the strip could be formed completely from a non-deformable, non-tacky material which necessarily requires an adhesive to secure it to the panels 1, 3. Any suitable adhesive could be used (including, for example, a hot-melt adhesive), and in this case the inner surface 7 of the strip is preferably stepped as shown in FIG. 6 to match the profile of the hem flange. As a still further alternative, the strip could be formed completely from a thermoplastics material and would be secured to the hem flange by first applying heat to the inner surface of the strip so that it melts and then pressing the molten surface against the hem flange.

When the strip 5 comprises a tacky sealing material 9 with a non-tacky outer part 10 as shown in FIGS. 3 to 9, suitable alternative materials to the butyl rubber mentioned above include polysulphide, polychloroprene, silicone and acrylic rubbers. As a further alternative, the tacky sealing material could be one that does not remain tacky but will cure, for example in response to applied heat, radiation or moisture, after it has been pressed into place on the hem flange. Suitable thermosetting materials include blocked polyurethane, and blocked isocyanates and epoxies; suitable radiation-curable materials include acrylates, epoxies and acrylate hybrids; and suitable moisture-curable materials include isocyanates and alkoxysilanes. Suitable alternative materials to polyurethanes for the outer part 10 of the sealing strip include polyolefins (for example, polyethylene and polypropylene) and polyvinyl resins.

Generally, it is required that the rounded outer surface of the strip 5 should substantially maintain its rounded shape when subjected to manual pressure (for example when being pressed into place over a joint) or should substantially revert to that rounded shape when the manual pressure is released. When the strip 5 has an outer layer 10 that extends beyond the sealing material 9 as shown in FIGS. 8 and 9, the extended edges of the outer layer may deflect slightly when the strip is pressed over a joint, although the generally rounded shape of the outer layer should be maintained. It is desirable to be able to reposition the strip when it is being applied but also desirable that the adhesion of the strip to the panels 1, 2 should become permanent once the strip is in place. It is also desirable that the final seal should be able to withstand temperatures over at least the range −30° C. to +90° C.

The outer surface of the part 10 of the sealing strip could be textured, if desired.

Although the above description refers specifically to a hem flange on a vehicle door, use of the sealing strips described is not restricted to that location or, indeed, to use on hem flanges. The sealing strips could, if appropriate, be used for any similar sealing job in any location, for example the sealing of a lapped joint or any other joint between two adjacent, generally parallel, panels or surfaces. It will also be appreciated that the various shapes described for the sealing strips can be modified to suit the locations in which they are to be used.

Each of the sealing strips 5 described above with reference to the drawings enables a hem flange to be sealed quickly and easily, and can be handled as soon as it has been applied. Sealing strips of the type described can be applied satisfactorily, without puckering, even when the line of the hem flange is curved (for example, at the top of a vehicle door). The resulting seal is effective in that it provides good corrosion resistance, and is uniform in appearance. Moreover, although the above description refers to the sealing strips being used in the repair of vehicles ( in which case the shape of a sealing strip can be selected so that the finished seal will closely resemble the original) they could also be used to seal the hem flanges of new vehicles. In the case of a vehicle repair, the paint applied over the seal will generally be one that cures at a comparatively low baking temperature (typically a temperature of about 60° to 80° C.) and the sealing strip used should be able to withstand at least such a temperature. In the manufacture of a new vehicle, on the other hand, a paint with a higher bake temperature (typically a temperature of about 140° C.) would be used and a sealing strip that can withstand those higher temperatures would be required.

We claim:

1. A sealed joint comprising:

a hem flange joining together inner and outer panels, said hem flange including an edge portion of said outer panel extending around an edge portion of the inner panel with an edge of the outer panel extending along a major surface of said inner panel and said outer panel having a major surface including a first generally planer portion facing the same direction as and generally parallel to said major surface of said inner panel, and spaced from said major surface of said inner panel by said edge; and a sealing strip comprising an elongate layer of non tacky material having opposite longitudinally extending edges, said layer of non tacky material bridging across said edge of the outer panel with one of said edges of the elongate layer of non tacky material extending along the major surface of said inner panel and the other of said edges of the elongate layer of non tacky material extending along said first generally planer portion of the major surface of said outer panel, said layer of non tacky material having a convex rounded outer surface on the side of said layer of non tacky material opposite said edge of the outer panel and an opposite inner surface spaced from said panels, and said sealing strip further comprising a sealing material adhered to said panels between said panels and said inner surface of said layer of non tacky material.

2. A sealed joint according to claim 1 wherein the rounded outer surface of the strip has a flattened central section.

3. A sealed joint according to claim 1 wherein the strip of non-tacky material has a concave inner surface.

4. A sealed joint according to claim 1 wherein said outer surface of the strip of non-tacky material is textured.

5. A sealed joint according to claim 1 wherein the non-tacky material is polyurethane.

6. A sealed joint according to claim 1 wherein the sealing material is butyl rubber.

7. A sealed joint according to claim 1 wherein said sealing material can be cured.

8. A sealed joint according to claim 7 wherein the curable sealing material is selected from the group of materials consisting of heat-curable, moisture-curable and radiation-curable materials.

9. A sealed joint as claimed in claim 1 wherein the edges of the layer of non tacky material extend beyond the sealing material of the sealing strip.

10. A method of sealing a hem flange joining together inner and outer panels, the hem flange including an edge portion of the outer panel extending around an edge portion of the inner panel with an edge of the outer panel extending along a major surface of the inner panel and the outer panel having a major surface including a first generally planer portion facing the same direction as and generally parallel to said major surface of said inner panel, and spaced from the major surface of the inner panel by the edge of the outer panel; said method comprising the steps of:

providing a sealing strip comprising an elongate layer of non tacky material having opposite longitudinally extending edges, the layer of non tacky material having a convex rounded outer surface and an opposite inner surface, and the sealing strip further comprising a sealing material along the inner surface of the layer of non tacky material;

positioning the sealing strip along the hem flange with the layer of non tacky material bridging across the edge of the outer panel with one of the edges of the elongate layer of non tacky material extending along the major surface of the inner panel and the other of the edges of the elongate layer of non tacky material extending along said first generally planer portion of the major surface of the outer panel, and pressing the layer of non tacky material toward the hem flange so that the sealing material along the inner surface of the layer of non tacky material adheres to and seals between the panels along the hem flange.

\* \* \* \* \*